US011260715B2

(12) United States Patent
Ruesing et al.

(10) Patent No.: US 11,260,715 B2
(45) Date of Patent: Mar. 1, 2022

(54) CHASSIS COMPONENT

(71) Applicant: BENTELER AUTOMOBILTECHNIK GMBH, Paderborn (DE)

(72) Inventors: Christian Ruesing, Paderborn (DE); Aloys Schroeder, Paderborn (DE); Guenter Fortmeier, Delbrueck (DE); Jens Sander, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 16/941,068

(22) Filed: Jul. 28, 2020

(65) Prior Publication Data

US 2021/0031581 A1 Feb. 4, 2021

(30) Foreign Application Priority Data

Jul. 29, 2019 (DE) ................... 10 2019 120 369.4

(51) Int. Cl.
*B60G 7/02* (2006.01)
*B62D 17/00* (2006.01)

(52) U.S. Cl.
CPC ............... *B60G 7/02* (2013.01); *B62D 17/00* (2013.01); *B60G 2204/143* (2013.01)

(58) Field of Classification Search
CPC ............... B60G 7/02; B60G 2204/143; B60G 2204/61; B60G 2200/46; B60G 2200/4622; B60G 7/001; B62D 17/00
See application file for complete search history.

(56) References Cited

U.S. PATENT DOCUMENTS 4,305,570 A * 12/1981 Castoe ................... B62D 17/00
254/100
6,176,501 B1 * 1/2001 Bartolone ................ B60G 3/20
280/86.756

(Continued)

FOREIGN PATENT DOCUMENTS

DE 102013005292 A1 10/2014
DE 102014116077 A1 5/2016

(Continued)

OTHER PUBLICATIONS

Office Action for German Application No. 10 2019 120 369.4 dated Jun. 15, 2020; 12pp.

(Continued)

*Primary Examiner* — Darlene P Condra
(74) *Attorney, Agent, or Firm* — Hauptman Ham, LLP

(57) ABSTRACT

The invention relates to a chassis component having a base face which extends in a base face plane and an aperture for the introduction of a fixing means and two retention elements which are arranged at opposite sides of the aperture for retaining an eccentric element, wherein the retention elements are formed integrally and in a materially engaging manner from the base face of the chassis component, wherein the retention elements are displaced out of the base face by mechanical processing. The chassis component affords a simple ability to be produced and an increased service life during operation.

16 Claims, 6 Drawing Sheets

(56) References Cited

U.S. PATENT DOCUMENTS

| | | | | |
|---|---|---|---|---|
| 6,409,189 | B1* | 6/2002 | Orimoto | B60G 7/02 280/86.751 |
| 9,586,452 | B2* | 3/2017 | Klaassen | B60G 7/008 |
| 2011/0068524 | A1* | 3/2011 | McCarthy | B60G 11/12 267/265 |
| 2013/0200587 | A1* | 8/2013 | Branger | B60G 7/005 280/124.13 |
| 2015/0097350 | A1* | 4/2015 | Shirakami | B60G 7/001 280/124.134 |
| 2016/0121676 | A1 | 5/2016 | Drabon et al. | |
| 2019/0176555 | A1 | 6/2019 | Behn | |

FOREIGN PATENT DOCUMENTS

| | | |
|---|---|---|
| DE | 102016215623 A1 | 2/2018 |
| DE | 102018009917 A1 | 6/2019 |
| EP | 3118032 A1 | 1/2017 |
| EP | 3118032 B1 | 4/2018 |
| JP | H06247336 A | 9/1994 |

OTHER PUBLICATIONS

Wikipedia "Jaguar I-Pace" last edited Jun. 5, 2021; 12pp.
A2Mac1 Automotive Benchmarking "Jaguar I-Pace EV400 First Edition—Highlights" https://portal.a2mac1.com/news/jaguar-i-pace-ev400-first edition-highlights/ Jul. 13, 2021; 2pp.
A2Mac1 Automotive Benchmarking "Jaguar I-Pace EV400 First Edition 2018" Media Gallery; Jul. 13, 2021; 20pp.
Chassis Analysis Report A2Mac1 Automotive Benchmarking "Jaguar I-Pace EV400 First Edition 2018"; pp. 1 to 123; 117pp.
3 photos of a section of the rear axle of a Jaguar I-Pace EV 400 First Edition 2018, namely in the area of the wishbone mount with retaining elements for an eccentric element; 3pp.
Wikipedia "Range Rover Evoque" concerning the passenger car model Range Rover Evoque of the manufacturer Land Rover; last edited May 12, 2021; 22pp.
Extract from A2Mac1 Automotive Benchmarking database with 6 photos of the rear axle of the 2012 Range Rover Evoque 2.2 SD4 Prestige; Aug. 4, 2021 ; 7pp.
6 Photographs of a section of the rear axle of a Range Rover LRX Evoque 201.2, in particular in the area of the wishbone mount with retaining elements for an eccentric element; Aug. 4, 2021; 6pp.
Registration certificate part [for a' n Range Rover Evoque 2.2 eD4 (first registration Oct. 10, 2012); 2pp.
15 Photos of the Range Rover Evoque 2.2 eD4 2012 according to D15 or a section of its rear axle in the area of the wishbone mount with retaining elements for an eccentric element; Aug. 4, 2021; 11pp.
Opposition for German Application No. 10 2019 120 369.4 dated Aug. 4, 2021; 24pp.

\* cited by examiner

CHASSIS COMPONENT

RELATED APPLICATIONS

The present application claims priority of German Application Number 10 2019 120 369.4 filed Jul. 29, 2019, the disclosure of which is hereby incorporated by reference herein in its entirety.

The invention relates to a chassis component having a base face which extends in a base face plane and an aperture for the introduction of a fixing means and two retention elements which are arranged at opposite sides of the aperture for retaining an eccentric element, wherein the retention elements are formed integrally and in a materially engaging manner from the base face of the chassis component.

Chassis components, such as, for example, wheel links for guiding a wheel, are mounted in motor vehicles on carrier elements. To this end, particular retention arrangements with retention elements are necessary and guide eccentric elements, such as eccentric disks or eccentric screws, in order, for example, to connect wheel links to such chassis components. These retention arrangements have to be constructed in such a manner that the wheel links can be orientated therein and desired travel properties can thus be ensured. For example, the tracking or camber of a motor vehicle can thus be adjusted.

A chassis component having such a retention arrangement generally has an aperture and two retention elements which are arranged at opposite sides of the aperture for retaining and/or guiding an eccentric disk or eccentric screw. The two retention elements are formed by a stop, respectively. Such a disk having an aperture for a screw or such a screw is rotatable about a rotation axis, relative to the retention arrangement and relative to the additional chassis component, in particular wheel links. Furthermore, the eccentric disk or eccentric screw is supported in a radial direction perpendicular to the rotation axis by retention elements so that the screw connection and consequently also the wheel link is displaceable in relative terms in relation to the carrier element by rotating the eccentric screw or screw.

To this end, an eccentric disk or eccentric screw has a collar which does not extend concentrically relative to the rotation axis but is instead constructed eccentrically relative to the rotation axis.

Such retention arrangements for retaining and/or guiding eccentric disks and/or eccentric screws for chassis components of motor vehicles are known in the general prior art.

Thus, DE 10 2018 009 917 A1 discloses a retention arrangement of a wheel link, wherein a separate integral component is used to support the eccentric screw. Such an integral component is constructed separately from a carrier element and a chassis component and is retained on this carrier element. The fixing with the carrier element is held in position by holes in the carrier element and two cylindrical formed elements in the integral component. However, the integral components require a separate production step and, in order to fix them to a chassis component, an additional operating step is necessary.

EP 3 118 032 B1 also discloses a retention arrangement of a wheel link. In this instance, however, the retention elements for supporting the eccentric disk are not arranged in a separate retention device, but instead the retention elements for guiding the eccentric element are introduced into the chassis component by cutting processing operations. However, such production involves great complexity.

As a result of DE 10 2014 116 077 A1, the prior art includes a wheel guiding arrangement for a wheel of a vehicle, that is to say a chassis component. It has a base face which extends in a base face plane and an aperture for the introduction of a fixing means and two retention elements which are arranged at opposite sides of the aperture for retaining an eccentric element. The retention elements are formed integrally and in a materially engaging manner from the base face of the chassis component and displaced out of the base face by mechanical processing.

A bearing arrangement which is constructed in a comparable manner is disclosed in DE 10 2016 215 623 A1.

JP H06-247 336 A and DE 10 2013 005 292 A1 disclose retention elements, which are displaced out of the base face by mechanical processing, for eccentric elements.

An object of the present invention is to provide a chassis component having retention elements which achieves a greater service life and which is nevertheless simple and cost-effective to produce.

This object is achieved by a retention arrangement having the features of Patent claim 1. Advantageous embodiments with advantageous developments of the invention are set out in the dependent claims.

A chassis component according to the invention has a base face which extends in a base face plane and an aperture for the introduction of a fixing means and two retention elements which are arranged at opposite sides of the aperture for retaining an eccentric element, wherein the retention elements are formed integrally and in a materially engaging manner from the base face of the chassis component and are displaced out of the base face by mechanical processing.

As a result of this configuration, the production of the retention elements can be carried out particularly simply because a separate component is unnecessary and the retention elements are readily formed from the material of the chassis component. This is carried out by simple operations, such as, for example, cutting, stamping, bending or partial shearing. As a result of the one-piece nature and the material uniformity, additional fixing of the retention elements is unnecessary. The retention elements can thereby be prevented from sliding in the completed chassis component, as when using a separate component, whereby the service life is substantially increased.

The retention elements according to the invention are preferably produced by displacing the material out of the base face of the chassis component in regions. This means that the portion of the base face which is intended to be shaped in order to form a retention element is displaced out of the base face plane in order to form a stop for an eccentric element.

In particular, the retention elements are produced by wedge-like displacement of the material of the chassis component out of the base face. This means that the displacement forms a raised portion at the side facing the aperture and approaches the base face in a substantially linear manner leading away from the aperture.

An alternative embodiment of the invention makes provision for the retention elements to be produced by step-like displacement of the material of the chassis component out of the base face.

This embodiment enables the retention elements to be constructed in a simple manner and the eccentric element to be retained and/or guided in a simple manner. Consequently, the above-mentioned advantages of durability and an increase in the service life can be achieved first.

It is inventively significant that the retention elements are displaced out of the base face plane at a maximum by a dimension which corresponds to the thickness of the base face. A stable stop for the eccentric element is thereby produced and a deterioration of the retention and/or guiding properties of the retention elements during permanent operation is prevented.

In order to produce the retention elements without the material of the base face being thinned, there is provision for the retention elements to have a free edge which faces the aperture and which is formed by a cut in the base face of the chassis component and which thus forms a stop which is raised relative to the base face for the eccentric element. This means that initially a cut is produced in the chassis component and, subsequently, the material of the chassis component is displaced at the side of the cut facing away from the aperture. In addition to preventing thinning, an additional advantage takes effect. By means of the cut provided, a straight abutment edge can be formed for the eccentric element. A possible sliding of the eccentric element is thereby prevented. Such an eccentric element could not be positioned directly on the base face of the chassis component in the case, for example, of a rounded edge and thus could not form the necessary retention when securing a screw which extends through the eccentric disk.

In this instance, the displacement of the retention element out of the base face plane is also carried out particularly preferably by a dimension which corresponds to the thickness of the base face. This means that the free edge projects beyond the cut edge in the base face and that, particularly between the base face and the retention element, there is no gap. Such an embodiment results in the retention element still being able to be supported on the base face and being able to take up relatively large adjustment forces. The retention elements being constructed integrally in a materially engaging manner is also advantageous in this case.

In order to increase the service life of the retention elements, there is provision, in addition to the integral nature, for the retention elements to be constructed in such a manner that a force path extending from the fixing means is guided past the retention elements. Thus, no stress peaks are produced in the region of the edges and corners of the retention elements and the tendency to crack is substantially reduced or cracks are completely prevented. The service life of the chassis components is thereby substantially improved.

In a particularly preferable manner, there is provision for the free edge to have a length which corresponds at a maximum to the extent of the aperture which is located between the retention elements in the same direction. As a result of this embodiment, stresses and forces which are produced in the fitted state are guided past the retention elements.

In order to be able to adjust, for example, the tracking of a vehicle by means of an eccentric element, the aperture is intended to be constructed in the form of an elongate hole. It is thereby possible to position between the retention elements by means of rotation of an eccentric screw and a screw which is connected to an eccentric disk. To this end, the free edges which are formed by cuts extend perpendicularly to the elongate hole.

In an advantageous construction variant, the retention elements have at least a first portion which has a trapezoidal cut contour. This means that the cut does not extend perpendicularly to the elongate hole, but instead further has at least two flanks which are directed away from the elongate hole.

Preferably, flanks of the cut consequently do not extend perpendicularly to the free edge, but instead define therewith an angle of less than 90°, preferably less than 70°. The width of the retention element is thereby further reduced, whereby the processing complexity is also reduced and forces and stresses which occur in the retention elements are reduced and consequently the durability is increased.

Furthermore, an embodiment of the invention makes provision for the trapezoidal cut contour to have rounded corners. This means that the corners have a rounded shape between the free edge and the two flanks which extend therefrom. The radius of these corners is selected to be as large as possible because this also combats a crack formation and consequently further increases the service life of the retention elements.

The flanks of the first portion preferably have a concave shape relative to each other. This means that the relevant corners of the first portion are connected to each other, not in a rectilinear manner, but instead in an arcuate manner, wherein the arc is curved outwardly. Such an embodiment has been found to be advantageous because stress peaks which are produced at acute angles are thus further reduced, in addition to the forces being guided past the retention elements. Thus, a further improvement of the service life of the retention elements is brought about.

An additional construction variant makes provision for the retention elements to have, at the side thereof facing away from the aperture, a second portion which adjoins the first portion. Preferably, the second portion has cut edges parallel with the aperture.

This configuration results in a better ability to produce the retention elements and an improvement of the service life.

There is advantageously further provision for the retention elements to be produced at the same time as the aperture. An additional improvement in relation to the prior art involves the retention elements being produced in the same method step as the aperture. In this case, processing steps such as perforating or stamping or cutting or shaping or partial shearing are used. In particular, this is carried out in a tool, in which the aperture is produced by means of a movable stamp and the retention elements are produced by means of cutting and/or shaping elements provided in the tool. Since such retention elements can be produced with extremely small tolerances, they are positioned relative to each other in a highly precise manner by simultaneously producing the aperture and retention elements. Since the production of the aperture and retention elements is carried out in the same tool, production costs are further reduced and simple production is enabled.

Retention elements according to the invention can be constructed in chassis components, such as wheel links, axle supports, auxiliary frames or the like, in particular for motor vehicles.

The invention is described in greater detail below with reference to the embodiments illustrated in the drawings, in which.

Figure 1:
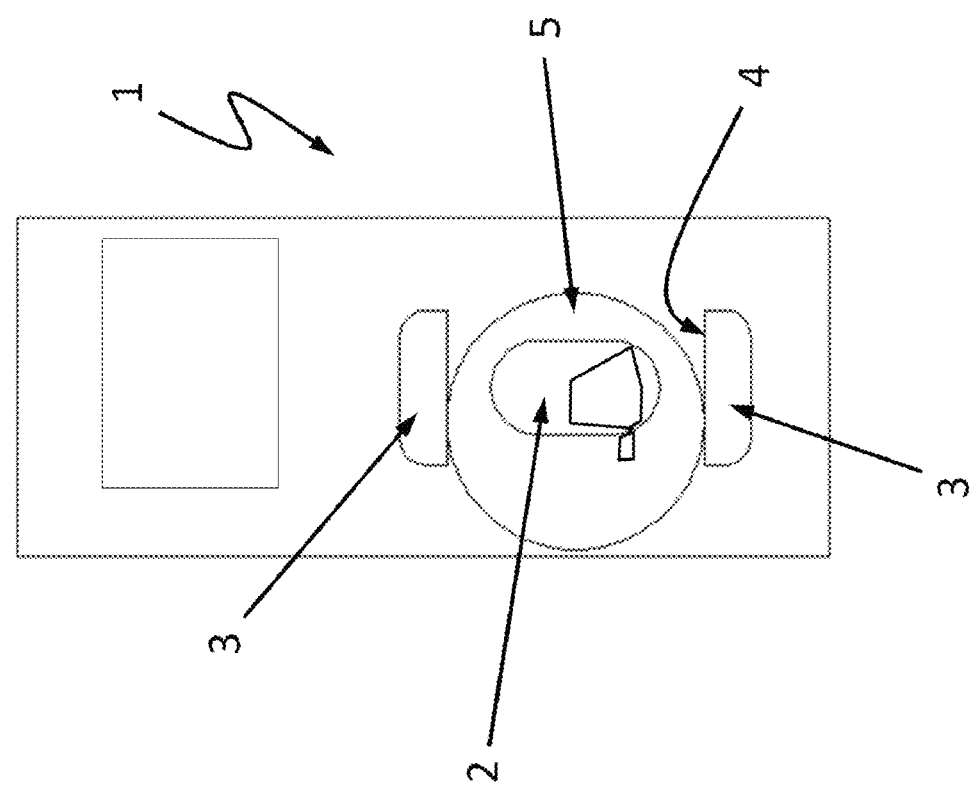
FIG. 1 shows a first construction variant of the invention.

FIG. 1 shows a retention arrangement 1 according to the invention in a chassis component which is not illustrated in greater detail. In this case, this may be a wheel link, a wheel carrier, an auxiliary frame or another chassis component. This retention arrangement comprises two retention elements 3 which are produced integrally and in a materially engaging manner from a base face of a chassis component. They each have a free edge 4 which is produced by means of a cut. This cut extends perpendicularly to an elongate hole 2 which is between the retention elements. Furthermore, the eccentric element 5 is illustrated here schematically. The material from the base face of the chassis component is produced here with a raised portion from the base face in 5 regions.

Figure 2:
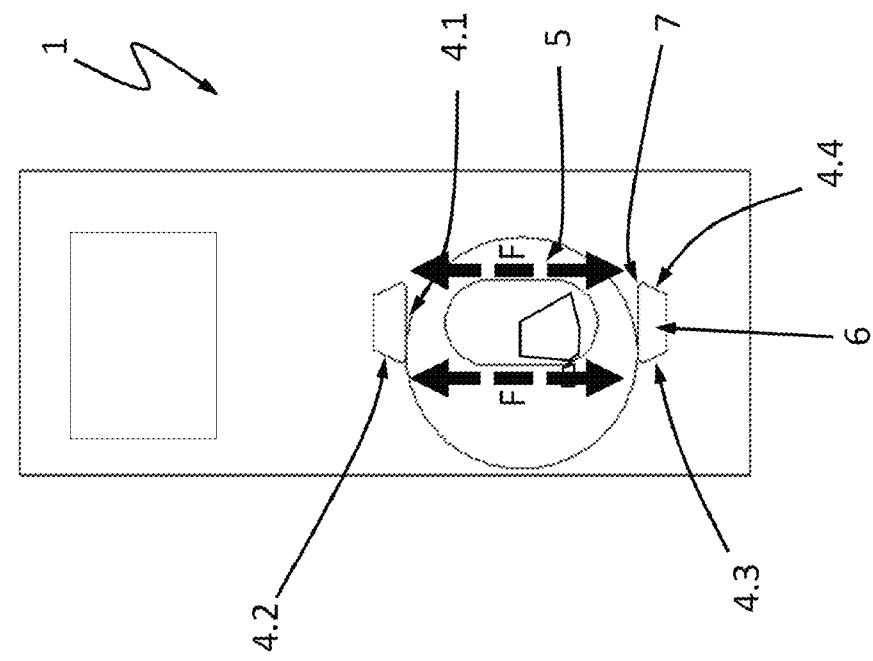
FIG. 2 shows a second construction variant of the invention.

FIG. 2 shows a second construction variant of a retention arrangement 1 for a chassis component. It comprises a base face which extends in a base face plane and an aperture 2 for the introduction of a fixing means, and two retention elements 6 which are arranged at opposite sides of the aperture for retaining an eccentric element 5, such as an eccentric screw or eccentric disk. The retention elements 6 are formed integrally and in a materially engaging manner from a base face of the chassis component and are displaced from the base face by mechanical processing.

In order to improve the service life of the retention elements 6, the forces and stresses which are produced in the fitted state as a result of the loading during operation are guided past them. The arrows represent the force path F. This is possible because, in the region of the free edge 4.1, the retention elements 6 have a length which corresponds at a maximum to the extent of the aperture 2 in the same direction. In addition to this embodiment, the retention elements 6 have a trapezoidal cut contour 4.2. To this end, the free edge 4.1 is continued at each end with a flank 4.3, 4.4 in a direction away from the aperture 2. The flanks 4.3, 4.4 form with the free edge 4.1 an angle of less than 90°, preferably less than 70°, and preferably greater than 45°. The free edge 4.1 of the retention elements 6 is displaced from the base face facing the aperture 2 so that they have a raised portion and thus form for the eccentric element 5 a stop for the retention and/or guiding. The raised portion of the free edge 4.1 corresponds to the thickness of the base face. Consequently, there is provided a wedge-like displacement of the retention elements 6 out of the base face. Furthermore, FIG. 2 shows that the corners 7 which are formed by the free edge 4.1 and the flanks 4.3, 4.4 have a rounded portion. They are advantageous because cracks at the corners as a result of the effects of forces are thus prevented.

Figure 3:
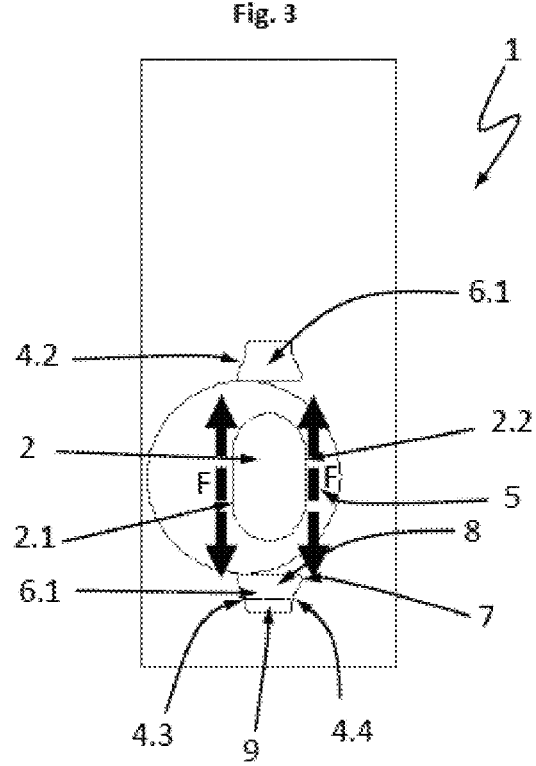
FIG. 3 shows a third construction variant of the invention.

In an additional construction variant, as illustrated in FIG. 3, a second portion 9 is connected adjoins the first portion 8.1 which is formed by the trapezoidal extent of the cut 4.2. In this second portion 9, the cut of the flanks extends parallel with each other and parallel with the edges 2.1, 2.2 of the aperture 2. Thus, the cut edge is extended and the inclination of the retention elements 6.1 which are raised relative to the stop decreases. Stresses are thereby decreased in the region, in which the face of the retention element 6.1 is displaced out of the base face of the chassis component in a wedge-like manner by mechanical processing. Thus, a retention arrangement, as illustrated in FIG. 3, has a base face of a chassis component with an aperture 2 which can be formed as an elongate hole. This aperture has at each of the two sides a retention element 6.1 which is displaced out of the base face by mechanical processing. The retention element 6.1 is consequently formed integrally and in a materially engaging manner from the base face of the chassis component. The retention elements 6.1 have a first portion 8.1 and a second portion 9. The first portion 8.1 is formed by a trapezoidal cut contour 4.2. In this case, the free edge 4.1 faces the aperture 2 and has a length which at a maximum corresponds to the extent of the aperture 2. The flanks 4.3, 4.4 which adjoin in a direction away from the free edge 4.1 of the aperture define therewith an angle of less than 90°, preferably less than 70°, and preferably greater than 45°. The corner 7 which is thereby formed has a rounded shape. A second portion 9 adjoins this first portion 8.1. The flanks 4.3, 4.4 continue parallel with each other therein and parallel with two edges 2.1, 2.2 of the aperture 2. As in FIG. 2, as a result of the embodiment of the retention elements 6.1, forces and stresses are guided past the arrangement, whereby the service life of the retention arrangement is improved. The retention element 6.1 which is formed by the cut is displaced out of the base face of the chassis component so that there is formed on the free edge 4.1 a raised portion which corresponds at a maximum to the thickness of the base face of the chassis component and which thus forms a stop for guiding and/or retaining an eccentric element 5.

Figure 4:
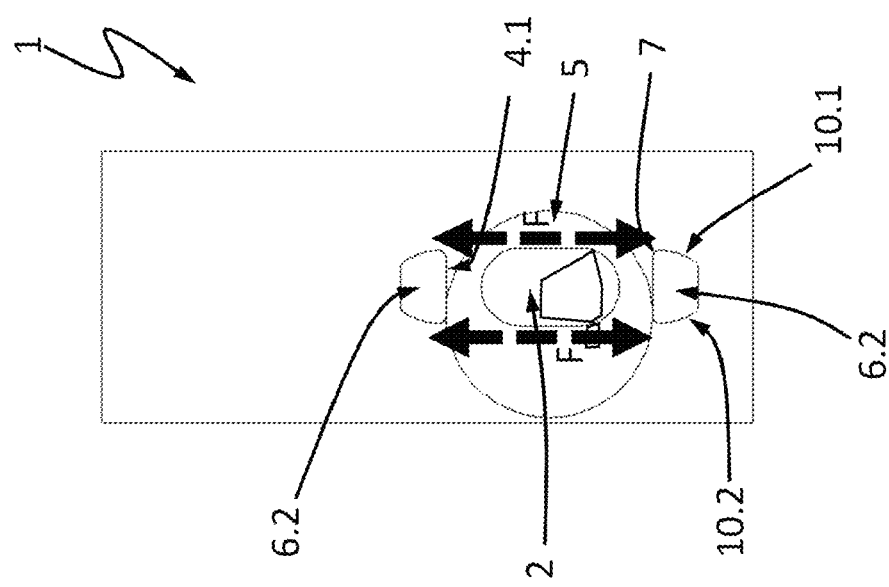
FIG. 4 shows a fourth construction variant of the invention.

FIG. 4 illustrates a fourth construction variant of the retention arrangement. In this instance, the retention element 6.2, as in the first construction variant, is formed by a trapezoidal cut 4.2. To this end, the retention element 6.2 which is formed integrally and in a materially engaging manner from of the base face of a chassis component has a free edge 4.1 which perpendicularly faces an aperture, in particular an elongate hole 2. The free edge 4.1 forms a raised portion by mechanical displacement of the base face and thus acts as a stop for an eccentric element 5. Two flanks 10.1, 10.2 adjoin the free edge 4.1 at the respective ends. They form with the free edge 4.2 a corner 7 which has a rounded shape. From this point, the flanks 10.1, 10.2 do not extend linearly relative to each other but instead have a cut contour which extends in a concave manner. Thus, a second radius or curvature 10.1, 10.2 is formed in addition to the rounded corners 7. In addition, the stresses in the rounded corners 7 can thereby be reduced. The service life of the retention elements 6.2 is substantially increased. The length of the free edge is also reduced here to the extent of the aperture 2 so that in the fitted state the forces and stresses are guided past the retention elements 6.2.

Figure 5A:
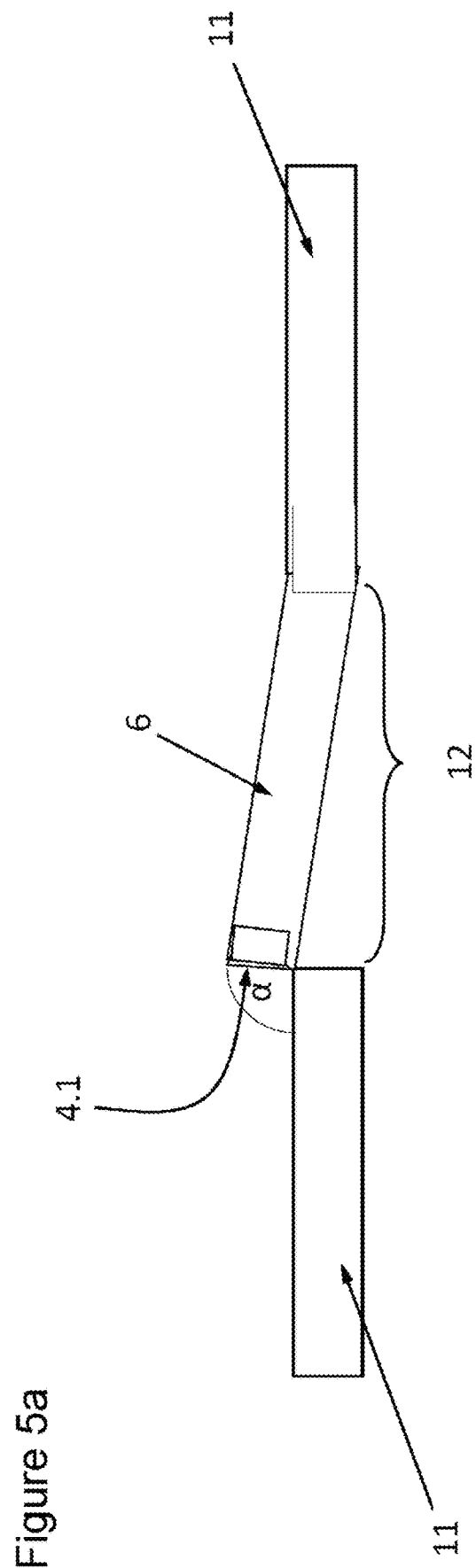
FIGS. 5a and 5b show two cross-sections of retention elements according to the invention.

FIG. 5a is a side view of a retention element 6 which is formed by mechanical processing integrally and in a materially engaging manner by displacement out of the base face 11 of a chassis component. It can clearly be seen in the diagram that the raised portion of the free end 4.1 corresponds at a maximum to the thickness of the base face 11. The wedge-like displacement 12 of the retention element 6 can also clearly be seen.

The retention element 6 is produced in the same method step as the aperture 2. To this end, the method step comprises processing steps, such as perforating or stamping or cutting or shaping. During the perforation of the aperture 2, the cut for producing the retention element is stamped and/or cut with the free edge 4.1. During the cutting, the retention elements 6 are mechanically formed directly and thus displaced out of the base face 11 in a wedge-like manner 12. Thus, the stops for guiding and/or retaining eccentric elements, such as eccentric disks or eccentric screws, are formed in chassis components.

Figure 5B:
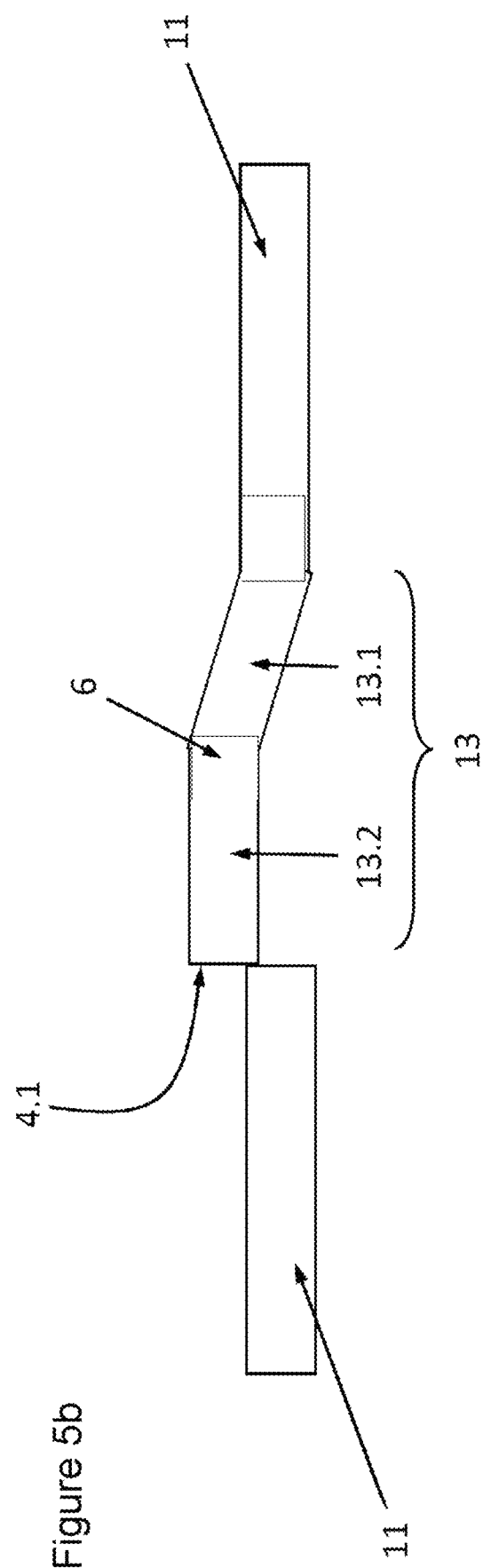

FIG. 5b is a side view of a retention element 6 which is formed by displacement out of the base face 11 of a chassis component integrally and in a materially engaging manner by mechanical processing. It can clearly be seen in the diagram that the raised portion of the free end 4.1 corresponds at a maximum to the thickness of the base face 11. In this instance, however, a wedge-like displacement 12, as illustrated in FIG. 5a, is not illustrated but instead a step-like displacement 13 of the retention element. The step has in this case two regions, in the region 13.1 the necessary raised portion is produced by a wedge-like displacement. This raised portion corresponds at a maximum to the layer thickness of the base face. A displacement 13.2 of the retention element 6 parallel with the base face adjoins this region. Unlike the merely wedge-like displacement, it is ensured in this case that the free edge 4.1 is perpendicular to the base face. During the wedge-like displacement, an angle α (alpha) of from 90° to 120° can be present between the base face and the displacement of the retention element 6.

The invention claimed is:

1. Chassis component having a base face which extends in a base face plane and an aperture for the introduction of a fixing means and two retention elements which are arranged at opposite sides of the aperture for retaining an eccentric element, wherein the retention elements are formed integrally and in a materially engaging manner from the base face of the chassis component and the retention elements are displaced out of the base face by mechanical processing, wherein the retention elements are displaced out of the base face plane at a maximum by a dimension which corresponds to the thickness of the base face.

2. Chassis component according to claim 1, wherein the retention elements are produced by displacing a material of the chassis component out of the base face in regions.

3. Chassis component according to claim 1, wherein the retention elements are produced by wedge shaped displacement of a material of the chassis component out of the base face.

4. Chassis component according to claim 1, wherein the retention elements are produced by step shaped displacement of a material of the chassis component out of the base face.

5. Chassis component according to claim 1, wherein the retention elements have a free edge which faces the aperture and which is formed by a cut in the base face of the chassis component and which forms a stop which is raised relative to the base face for the eccentric element.

6. Chassis component according to claim 1, wherein the retention elements are constructed in such a manner that a force path extending from the fixing means is guided past the retention elements.

7. Chassis component according to claim 1, wherein the free edge has a length which corresponds at a maximum to the extent of the aperture in the same direction.

8. Chassis component according to claim 1, wherein the free edge extends perpendicularly to an aperture which is constructed as an elongate hole at least in portions.

9. Chassis component according to claim 1, wherein the retention elements have at least a first portion which has a trapezoidal cut contour.

10. Chassis component according to claim 9, wherein the free edge and flanks of the first portion define an angle of less than 90°.

11. Chassis component according to claim 9, wherein the trapezoidal cut contour has rounded corners.

12. Chassis component according to claim 9, wherein flanks of the first portion have a concave shape relative to each other.

13. Chassis component according to claim 9, wherein the retention elements have, at the side thereof facing away from the aperture a second portion which adjoins the first portion.

14. Chassis component according to claim 13, wherein the second portion has cut edges parallel with the aperture.

15. Chassis component according to claim 9, wherein the free edge and flanks of the first portion define an angle of less than 70°.

16. Chassis component according to claim 1, wherein the retention elements are produced at the same time as the aperture.

* * * * *